(12) United States Patent
Yoshinobu

(10) Patent No.: US 7,373,331 B2
(45) Date of Patent: May 13, 2008

(54) JOINT SUBSCRIBER MANAGEMENT SYSTEM AND RECEIVING TERMINAL

(75) Inventor: Hitoshi Yoshinobu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1238 days.

(21) Appl. No.: 10/142,371

(22) Filed: May 9, 2002

(65) Prior Publication Data

US 2002/0188844 A1   Dec. 12, 2002

(30) Foreign Application Priority Data

May 11, 2001   (JP)   ............................. 2001-141970

(51) Int. Cl.
*G06Q 99/00*   (2006.01)
(52) U.S. Cl. .......................... 705/64; 705/67; 713/182
(58) Field of Classification Search .................. 705/64, 705/67; 713/182
See application file for complete search history.

(56) References Cited

U.S. PATENT DOCUMENTS

2005/0028208 A1*   2/2005   Ellis et al. .................... 725/58

FOREIGN PATENT DOCUMENTS

JP   410164548   *   6/1998

* cited by examiner

*Primary Examiner*—Pierre E. Elisca
(74) *Attorney, Agent, or Firm*—Frommer Lawrence & Haug LLP; William S. Frommer; Paul A. Levy

(57) ABSTRACT

A joint subscriber management system includes a joint subscriber management unit for acting as a surrogate in performing a registration activity for enabling a receiver to receive a broadcast and/or an electronic commerce transaction. A reception unit receives a reception-limiting identification number of the receiver for receiving a specific broadcast, a broadcaster identification number of at least one broadcaster of a plurality of broadcasters, and registrant information concerning registration of a user allocated to the reception-limiting identification number. A generation unit generates a joint management identification number corresponding to the received reception-limiting identification number. A recording unit records the reception-limiting identification number, the joint management identification number, and the registrant information in a registrant information table in correspondence with one another. A management/operation unit acts as a surrogate in member management and the electronic commerce transaction in accordance with the registrant information table.

7 Claims, 17 Drawing Sheets

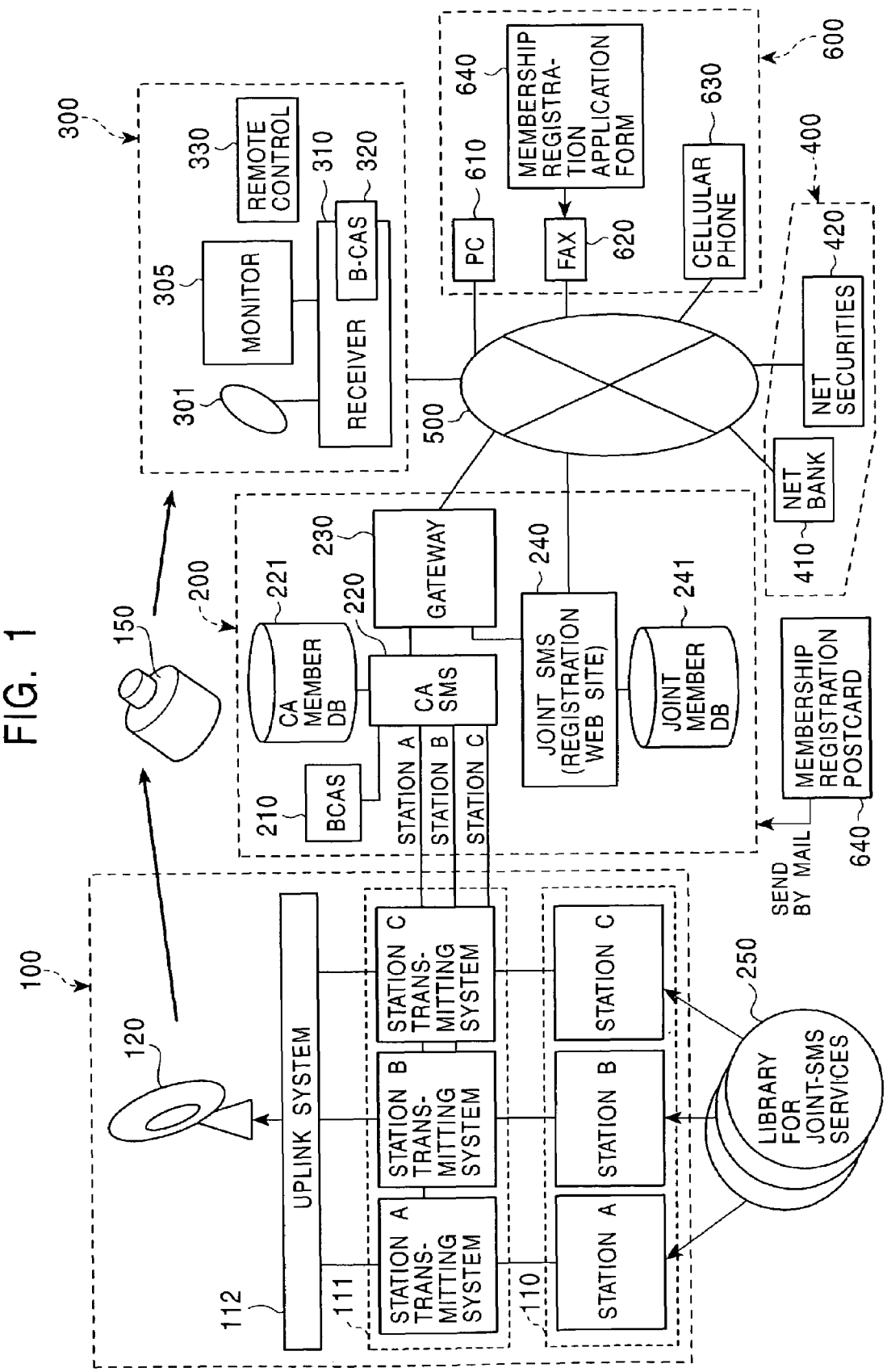

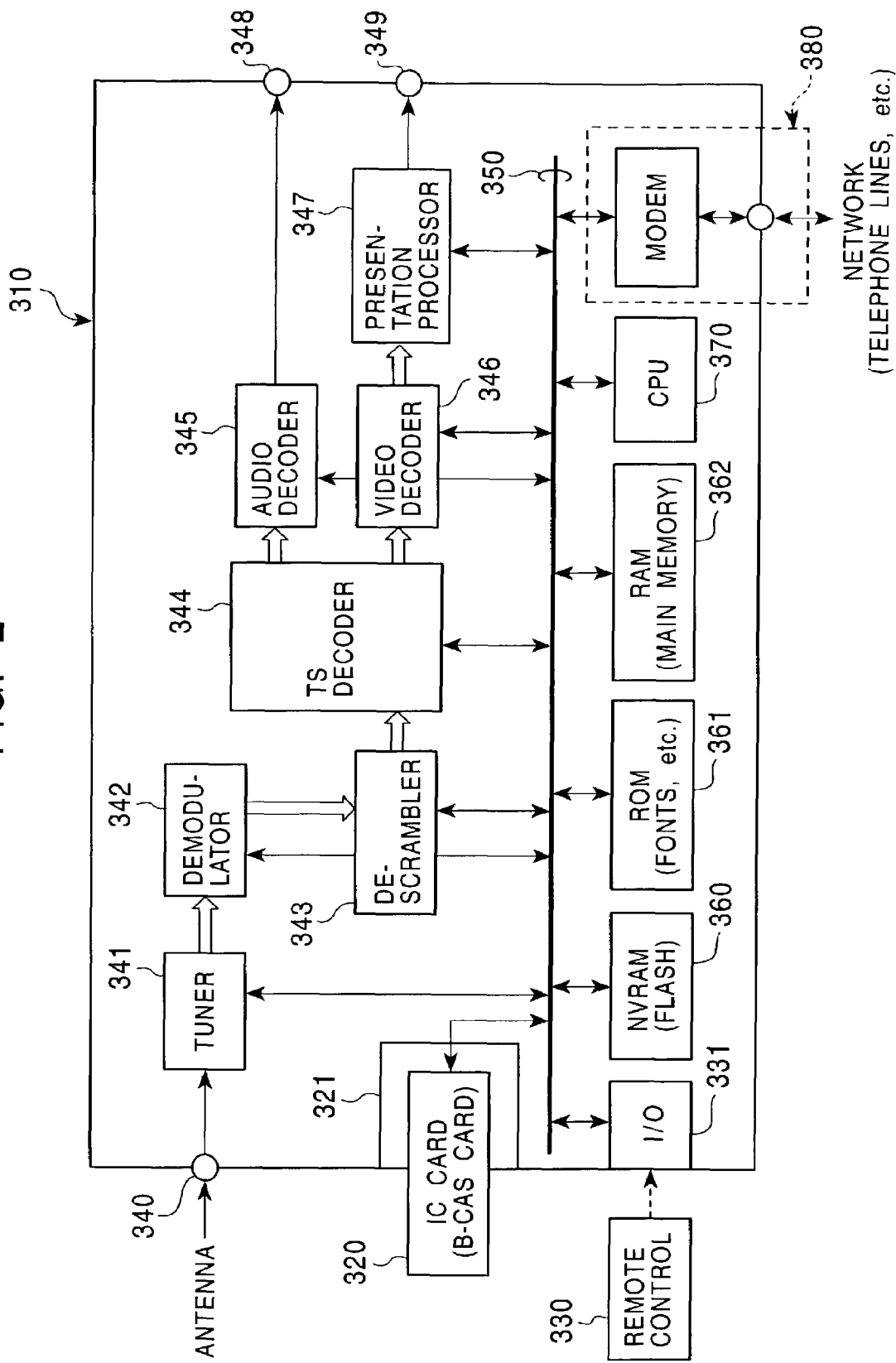

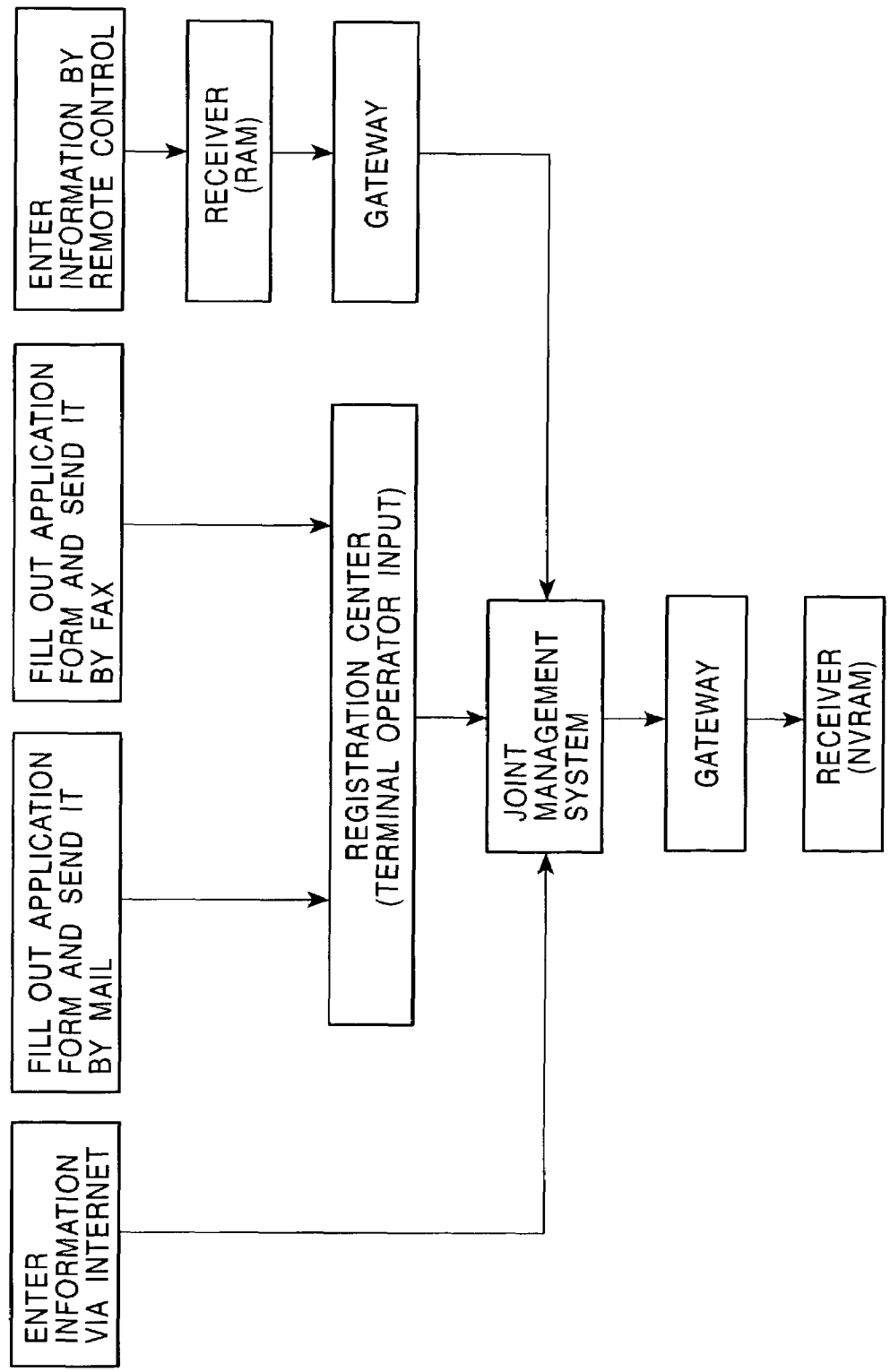

FIG. 4

```
┌─────────────────────────────────────────────────────┐
│        INTERACTIVE MEMBERSHIP CONTRACT              │
│        FAX NO.  xxxx-xxx-xxxx                       │
└─────────────────────────────────────────────────────┘
```

B-CAS CARD NO.
PUT A SUBSCRIPTION BARCODE SEAL OR WRITE THE NUMBER.

I AGREE WITH THE TERMS AND CONDITIONS SET FORTH FOR THE CHECKED BOX(ES) BELOW AND HEREBY APPLY FOR THE MEMBERSHIP CONTRACT.

☐ MULTI-CHANNEL ENTERTAINMENT ☐ ACTIVE BROADCASTING ☐ INTERAC TV ☐ SERVICE A
☐ SERVICE B ☐ SERVICE C ☐ SERVICE E ☐ SERVICE F ☐ SERVICE G ☐ SERVICE H

| FOR REPRESENTATIVE REPRESENTATIVE'S NAME | | | ADDRESS | |
|---|---|---|---|---|
| SEX | M · F | DATE OF BIRTH (DD/MM/YY) | | PASSWORD (4 DIGITS) |
| PHONE | | | EMAIL | |
| FAX | | | EMAIL | |

BILL WILL BE SENT BY:
☐ 1. MAIL  ☐ 2. EMAIL  ☐ CELLULAR PHONE EMAIL
※ IF YOU SELECT 2 OR 3, YOU WILL RECEIVE *% DISCOUNT ON YOUR SUBSCRIPTION FEE.

| FAMILY MEMBER NAME | SEX | DATE OF BIRTH | EMAIL ADDRESS | PASSWORD | AUTHORITY |
|---|---|---|---|---|---|
| 1 | | | | | |
| 2 | | | | | |
| 3 | | | | | |
| 4 | | | | | |
| 5 | | | | | |
| 6 | | | | | |
| 7 | | | | | |

- PAYMENT AUTHORITY MODE
- 1. PARTICIPATE IN PROGRAM   2. TV SHOPPING PERMITTED   3. TV BANKING PERMITTED

FIG. 6

INTERACTIVE MEMBERSHIP CONTRACT

B-CAS CARD NO.
☐-☐-☐-☐-☐

I AGREE WITH THE TERMS AND CONDITIONS SET FORTH FOR THE CHECKED BOX(ES) BELOW AND HEREBY APPLY FOR THE MEMBERSHIP CONTRACT.

☐ MULTI-CHANNEL ENTERTAINMENT ☐ ACTIVE BROADCASTING ☐ INTERAC TV ☐ SERVICE A
☐ SERVICE B ☐ SERVICE C ☐ SERVICE E ☐ SERVICE F ☐ SERVICE G ☐ SERVICE H

| FOR REPRESENTATIVE | | | | ADDRESS | |
|---|---|---|---|---|---|
| REPRESENTATIVE'S NAME | | | | | |
| SEX ○ ○ M・F | DATE OF BIRTH | (DD/MM/YY) ☐/☐/☐ | | PASSWORD (4 DIGITS) | |
| PHONE ☐-☐-☐ | | | | EMAIL ☐ @ ☐ | |
| FAX ☐-☐-☐ | | | | CELLULAR PHONE EMAIL ☐ @ ☐ | |

BILL WILL BE SENT BY:
☐ 1. MAIL ☐ 2. EMAIL ☐ CELLULAR PHONE EMAIL

※ IF YOU SELECT 2 OR 3, YOU WILL RECEIVE *% DISCOUNT ON YOUR SUBSCRIPTION FEE.

| FAMILY MEMBER | NAME | M F | DATE OF BIRTH | EMAIL ADDRESS | PASSWORD | AUTHORITY |
|---|---|---|---|---|---|---|
| 1 | | ○ ○ | ☐/☐/☐ | ☐@☐ | | 1 2 3 ○ ○ ○ |
| 2 | | ○ ○ | ☐/☐/☐ | ☐@☐ | | ○ ○ ○ |
| 3 | | ○ ○ | ☐/☐/☐ | ☐@☐ | | ○ ○ ○ |
| 4 | | ○ ○ | ☐/☐/☐ | ☐@☐ | | ○ ○ ○ |
| 5 | | ○ ○ | ☐/☐/☐ | ☐@☐ | | ○ ○ ○ |
| 6 | | ○ ○ | ☐/☐/☐ | ☐@☐ | | ○ ○ ○ |
| 7 | | ○ ○ | ☐/☐/☐ | ☐@☐ | | ○ ○ ○ |

- PAYMENT AUTHORITY MODE
- 1. PARTICIPATE IN PROGRAM   2. TV SHOPPING PERMITTED   3. TV BANKING PERMITTED

FIG. 12

LAST NAME
(UP TO 8 CHARACTERS)

♉BS FUJI

SELECT A CHARACTER AND PRESS "CONFIRM"
TO ENTER THE CHARACTER.

Q W E R T Y U I O P ? `
A S D F G H J K L ; : '
Z X C V B N M , . / – –

AFTER ENTERING NAME,
PRESS "NEXT PAGE".

A WRONG CHARACTER
CAN BE DELETED BY
PRESSING "DELETE".

| DELETE | GO BACK | SKIP | PREVIOUS PAGE | NEXT PAGE |

FIG. 13

NAME

[QWERTYUIOP?']
[ASDFGHJKL;:']
[ZXCVBNM,./_-]
[ALPHA-NUMERIC][GO BACK][SKIP][DELETE][SYMBOL]

BS-i CLUB

SELECT A CHARACTER BY USING ARROW
KEYS AND PRESS "OK" TO ENTER THE CHARACTER.
THEN, PRESS "CONFIRM".

[BACK] [CONFIRM]

---

ENTER YOUR NAME
LAST: 200004019432MATSU
FIRST:

[DELETE]

[ALPHABET]
[NUMERAL]

[' ][QWERTYUIOP?]
[' ][ASDFGHJKL;:]
[- ][ZXCVBNM,./_-]

[ENTER LAST NAME] [ENTER FIRST NAME]

[DISPLAY LIST] [NEXT] [CANCEL SIGN-UP]

ENTER YOUR LAST NAME. PRESS "CONFIRM",
SELECT A CHARACTER BY USING ARROW KEYS,
AND PRESS "CONFIRM".

FIG. 14

FAMILY INFORMATION REGISTRATION  (BS CLUB)

POSTAL CODE ☐ ☐
(7 DIGITS)
ADDRESS
(UP TO 60 CHARACATERS)
☐
PHONE NO. ☐ ☐ ☐

SELECT ENTRY BOX BY USING ARROW KEYS.
ENTER NUMERALS BY USING NUMERIC BUTTONS ON THE REMOTE CONTROL. USE BACK BUTTON ON THE REMOTE CONTROL TO GO BACK ONE CHARACTER.

IF YOUR ADDRESS AND PHONE NUMBER CHANGE,
PLEASE CALL US AT CUSTOMER CENTER AT 1234-567-890.

( BACK )  ( NEXT )

FAMILY INFORMATION REGISTRATION  (BS CLUB)

POSTAL CODE ☐ ☐
(7 DIGITS)
ADDRESS
(UP TO 60 CHARACATERS)
☐
PHONE NO. ☐ ☐ ☐

SELECT ENTRY BOX BY USING ARROW KEYS.
ENTER NUMERALS BY USING NUMERIC BUTTONS ON THE REMOTE CONTROL. USE BACK BUTTON ON THE REMOTE CONTROL TO GO BACK ONE CHARACTER.

IF YOUR ADDRESS AND PHONE NUMBER CHANGE,
PLEASE CALL US AT CUSTOMER CENTER AT 1234-567-890.

( BACK )  ( NEXT )

FIG. 15

CLUB MediArk MEMBERSHIP REGISTRATION

| NEW REGISTRATION |
| SUBSEQUENT REGISTSRATION |
| INQUIRY/CHANGE |

| BACK TO TOP |

SELECT ENTRY BOX BY USING ARROW KEYS ON THE REMOTE CONTROL.
PRESS "CONFIRM" TO CONTINUE.

THE REPRESENTATIVE IS TO BE REGISTERED AT THE CENTER. PRESS "CONFIRM" TO PROCEED TO THE REGISTRATION SCREEN.

---

PERSONAL NO.: [1]

THE REPRESENTATIVE IS TO BE REGISTERED.

KIY▲SHI MAT●MOTO

FOR REGISTRATION OF THE REPRESENTATIVE, THE PERSONAL NUMBER IS AUTOMATICALLY "1".

SELECT "NEXT" BY USING ARROW KEYS ON THE REMOTE CONTROL AND PRESS "CONFIRM" TO PROCEED TO THE REGISTRATION SCREEN.

| NEXT | CANCEL MEMBERSHIP REGISTRATION |

THE REPRESENTATIVE IS TO BE REGISTERED AT THE CENTER. PRESS "CONFIRM" TO PROCEED TO THE REGISTRATION SCREEN.

FIG. 16

ENTER YOUR NAME
LAST: 200004019432MARI
FIRST:

[DELETE]

[ALPHABET]
[NUMERAL]

` Q W E R T Y U I O P ?
  A S D F G H J K L ; :
- Z X C V B N M , . / _

[ENTER LAST NAME] [ENTER FIRST NAME]

[DISPLAY LIST] [NEXT] [CANCEL MEMBERSHIP REGISTRATION]

ENTER YOUR LAST NAME. MOVE TO THE CHARACTER TABLE AND SELECT A CHARACTER BY USING ARROW KEYS.

---

ENTER POSTAL CODE (7 DIGITS)

☐ – ☐          [DELETE]

1 2 3
4 5 6
7 8 9
0

SELECT A NUMERAL BY USING ARROW KEYS ON THE REMOTE CONTROL AND PRESS "CONFIRM" TO ENTER THE NUMERAL.

[DISPLAY LIST] [NEXT] [CANCEL MEMBERSHIP REGISTRATION]

SELECT A NUMERAL TO ENTER BY USING ARROW KEYS AND PRESS "CONFIRM".

FIG. 17

| CONFIRM/ENTER INFORMATION | ITEM(S) ENTERED | 1/2 |
|---|---|---|
| NAME : | 200004019432KIY♠SHI MAT●MOTO0100 | ENTRY |
| POSTAL CODE : | ☐ — ☐ | ENTRY |
| ADDRESS : | ☐ | ENTRY |
| PHONE NO. : | 23 — 12 — 1234 | ENTRY |
| FAX NO. : | ☐ | ENTRY |

SELECT THE ENTRY BUTTON FOR AN ITEM TO ENTER BY USING ARROW KEYS ON THE REMOTE CONTROL AND PRESS "CONFIRM" TO PROCEED TO THE ENTRY SCREEN.

| BACK | NEXT | CANCEL MEMBERSHIP REGISTRATION |

ENTER THE REGISTRANT'S NAME. PRESS "CONFIRM" TO PROCEED TO THE ENTRY SCREEN.

JOINT SUBSCRIBER MANAGEMENT SYSTEM AND RECEIVING TERMINAL

BACKGROUND OF THE INVENTION

1. Field of the Invention

The present invention relates to joint subscriber management systems and to receiving terminals, and more particularly relates to a joint subscriber management system for making viewing/listening contracts (hereinafter referred to as "subscriptions") and membership registrations with a plurality of broadcasters and service providers and for managing members and operating electronic commerce (hereinafter referred to as "e-commerce") transactions in accordance with registered information, and to a receiving terminal 2. Description of the Related Art In known digital broadcasting using a conditional access system (CAS), user-interactive data broadcasts have been delivered. For example, listeners/viewers can perform e-commerce transactions (television-commerce or t-commerce), purchase items (television shopping or t-shopping), and participate in quiz shows in real time.

In such digital broadcasting, for example, in broadcasting satellite (BS) digital broadcasting, a BS broadcasting receiver including a BS digital tuner and an antenna is installed. Free-of-charge programs can be received to immediately after the receiver has been installed. Interactive data broadcasts can be received by a user by making subscriptions and membership contracts with individual broadcasters and service providers.

For example, if a user wants to subscribe to WOW Inc. and Star Channel, Inc., the user individually subscribes to these broadcasters. If a user wants to subscribe to BS Fuji, Inc., BS-i, Inc., and Asahi Satellite Broadcasting Limited (BS Asahi), the user makes a joint (common) subscription membership registration with the three broadcasters. If a user wants to subscribe to BS Nippon Corporation (BS Nippon) and B.S. Japan Corporation (BS Japan), the user makes a joint (common) subscription membership registration with the two broadcasters.

Subscriptions are made with broadcasters in substantially the same manner. A smart card, which is referred to as a "B-CAS card", supplied with a purchased digital tuner is used for viewing and listening to digital broadcasts. The user fills out an application form or an application card by writing a card number indicated on the smart card (the card number may be printed in advance on a card or a seal) and registrant information, such as the user's address, name, date of birth, age, sex, phone number, fax number, e-mail address, the method of payment (account transfer or credit card) for t-commerce and t-shopping, and an account number or a credit card number used to make payments, and the user sends the application form or the application card by mail or fax. Alternatively, the user may use a predetermined web site or a registration application data broadcast (and content thereof) delivered by each broadcaster to enter the registrant information, thereby making a contract (registration).

Cases in which the user registers for subscription on a registration service channel will be described. For example, FIG. 12 shows a registration screen for BS Fuji on which the user is asked to enter his/her "last name". FIG. 13 shows two registration screens for BS-i. On one screen, the user is asked to enter his/her "name (first name and last name)" in one entry space. On the other screen, the user is asked to enter his/her "last name" and "first name" in two separate entry spaces on the same screen. The user enters his/her first name and last name by selecting alphanumeric buttons displayed on the screen by using operation buttons on a remote control. The user presses "Confirm" to proceed to the next entry space or screen. In accordance with the screen, the user enters predetermined items.

When a plurality of members, such as family members, makes a contract, as in a registration screen displayed in FIG. 14 (BS Asahi and Digicas), the user selects a family information registration screen and enters predetermined items, such as postal code, address, and phone number. FIGS. 15 to 17 show registration screens for MediArk. The registration screen shown in FIG. 15 displays a menu containing a new registration option, a subsequent registration option, and an inquiry/change option. When making a new registration, the user enters a personal number and enters the representative's name, postal code, address, phone number, and fax number. Subsequently, the user enters a second subscriber, and so forth. For each desired broadcaster (service channel), the user must enter and register predetermined registrant information in order to view and listen to broadcast programs.

If the user wants to subscribe to a plurality of or all of broadcasters and provided services, the user must repeatedly enter similar registrant information for each broadcaster and for each service provider. This registration procedure is burdensome for the user.

For example, when the user registers for subscription on a registration service channel, the user enters alphabet and numeral characters displayed on the screen by pressing the operation buttons on the remote control, presses "Confirm" to proceed to the next screen, and sequentially enters predetermined information. Although information to enter is substantially the same among broadcasters and only the sequence of registration and the screens are different from broadcaster to broadcaster, the user must repeatedly perform similar operations for each desired broadcaster to which the user wants to subscribe (register). The user may run short of ID number seals, which are required for registration, when registering for subscription to all the broadcasters by application form or cards.

Since broadcasters and service providers for providing broadcast programs are required to individually construct, manage, and operate systems for managing registrant information, the broadcasters and the service providers are forced to bear high cost and the management/operation burden.

SUMMARY OF THE INVENTION

Accordingly, it is an object of the present invention to lessen the burden of making subscriptions and contracting/registering registrant information with broadcasters and service providers and to reduce the burden of operating/managing subscription information and the registrant information.

In order to achieve the foregoing objects, a joint subscriber management system and a receiving terminal according to the present invention are arranged as below.

(1) A joint subscriber management system includes a joint subscriber management unit for acting as a surrogate in performing a registration activity for enabling a receiver to receive a broadcast and/or in performing an electronic commerce transaction. The joint subscriber management unit includes a reception unit for receiving a reception-limiting identification number of the receiver for receiving a specific broadcast, a broadcaster identification number of at least one broadcaster of a plurality of broadcasters, and registrant information concerning registration of a user allocated to the reception-limiting identification number; a generation unit for generating a joint management identification number corresponding to the reception-limiting identification number received by the reception unit; a recording unit for recording the reception-limiting identification number, the joint management identification number, and the registrant information in a registrant information table in correspondence with one another; and a management/operation unit for acting as a surrogate in performing member management and the electronic commerce transaction in accordance with the recorded registrant information table.

(2) In a joint subscriber management system according to (1), the receiver may include a reception-limiting-identification-number transmitting unit for transmitting the reception-limiting identification number included in the receiver to the joint subscriber management unit; a reception unit for receiving the registrant information corresponding to the reception-limiting identification number and the joint management identification number, the registrant information being transmitted from the joint subscriber management unit; and a storage unit for storing the received registrant information.

(3) In a joint subscriber management system according to (2), the joint subscriber management unit may further include a detection unit for detecting updated information of the registrant information; an authentication unit for performing, when the updated information is detected by the detection unit, authentication by comparing the reception-limiting identification number included in the receiver with the receiver's reception-limiting identification number in the registrant information table registered in the joint subscriber management unit; a processing unit for receiving the registrant information stored in the receiver when it is confirmed that the two reception-limiting identification numbers coincide with each other, and for processing a processing signal transmitted from the receiver when the registrant information stored in the registrant information table coincides with the registrant information received from the receiver; and a payment transaction unit for performing a payment transaction involved in the processing performed by the processing unit.

(4) In a joint subscriber management system according to (1), the joint subscriber management unit may further include a unit for receiving the registrant information including a plurality of registration items transmitted from the receiver; a registration unit for registering the received registrant information; and a registration-item transmitting unit for selecting a necessary registration item from the registrant information in accordance with a signal transmitted from each of the broadcasters and for transmitting the selected registration item to the broadcaster.

(5) In a joint subscriber management system according to (1), when the joint subscriber management unit receives an unregistered reception-limiting identification number from the receiver, the joint subscriber management unit may transmit a registration information menu page including a plurality of new registration items to the receiver. The joint subscriber management unit may receive the registrant information set by inputting data by the receiver in accordance with the menu. The joint subscriber management unit may register the registrant information so as to correspond to the reception-limiting identification number in accordance with the received registrant information. The joint subscriber management unit may generate the joint management identification number when the registrant information is registered.

(6) In a joint subscriber management system according to (1), the broadcaster identification number may include a number of a broadcaster for delivering an interactive broadcast.

(7) In a joint subscriber management system according to (6), the interactive broadcast may include a digital broadcast delivered by using at least one of a satellite, terrestrial waves, a wired network, and a wireless network.

(8) In a joint subscriber management system according to (1), the broadcaster identification number may include a number of a service provider for providing a membership service.

(9) In a joint subscriber management system according to (1), the registrant information may include information including personal information required to perform television commerce, television trading, and television banking.

(10) In a joint subscriber management system according to (1), the joint management identification number may be substituted for by the reception-limiting identification number.

(11) In a joint subscriber management system according (1), the electronic commerce transaction may include authentication and a payment transaction.

(12) In a joint subscriber management system according to (1), the management/operation unit may include functions for performing authentication, matching, a payment transaction, alteration of contract, and updating.

(13) A receiving terminal is in a joint subscriber management system including a joint subscriber management unit for acting as a surrogate in performing a registration activity for enabling a receiver to receive a broadcast and/or in performing an electronic commerce transaction. The joint subscriber management unit includes a reception unit for receiving a reception-limiting identification number of the receiver for receiving a specific broadcast, a broadcaster identification number of at least one broadcaster of a plurality of broadcasters, and registrant information concerning registration of a user allocated to the reception-limiting identification number; a generation unit for generating a joint management identification number corresponding to the reception-limiting identification number received by the reception unit; a recording unit for recording the reception-limiting identification number, the joint management identification number, and the registrant information in a registrant information table in correspondence with one another; and a management/operation unit for acting as a surrogate in performing member management and the electronic commerce transaction in accordance with the recorded registrant information table. The receiving terminal includes a reception-limiting-identification-number transmitting unit for transmitting the reception-limiting identification number of the receiver to the joint subscriber management unit; and a storage unit for storing the registrant information. The registrant information includes the reception-limiting identification number and the joint management identification number, the joint management identification number being generated in correspondence with information on a user owning the receiver and the reception-limiting identification number. The registrant information is transmitted to the receiver only when the reception-limiting identification number received by the joint subscriber management unit can be recognized from the registrant information table.

(14) In a receiving terminal according to (13), the registrant information may be extracted and/or edited by the reception-limiting identification number and the joint management identification number.

(15) In a receiving terminal according to (13), the joint subscriber management unit may further include a detection unit for detecting updated information of the registrant information; an authentication unit for performing, when the updated information is detected by the detection unit, authentication by comparing the reception-limiting identification number in the registrant information stored in the storage unit of the receiver with the receiver's reception-limiting identification number in the registrant information table registered in the joint subscriber management unit; and a processing and payment-transaction unit for receiving the registrant information stored in the receiver when it is confirmed that the two reception-limiting identification numbers coincide with each other, and for processing a processing signal transmitted from the receiver and performing a payment transaction involved in the processing when the registrant information stored in the registrant information table coincides with the registrant information received from the receiver.

(16) In a receiving terminal according to (13), the joint subscriber management unit may further include a unit for receiving the registrant information including a plurality of registration items transmitted from the receiver; a registration unit for registering the received registrant information; and a registration-item transmitting unit for selecting a necessary registration item from the registrant information in accordance with a signal transmitted from each of the broadcasters and for transmitting the selected registration item to the broadcaster.

(17) In a receiving terminal according to (13), when the joint subscriber management unit receives an unregistered reception-limiting identification number from the receiver, the joint subscriber management unit may transmit a registration information menu page including a plurality of new registration items to the receiver. The joint subscriber management unit may receive the registrant information set by inputting data by the receiver in accordance with the menu. The joint subscriber management unit may register the registrant information so as to correspond to the reception-limiting identification number in accordance with the received registrant information. The joint subscriber management unit may generate the joint management identification number when the registrant information is registered.

(18) A joint subscriber management system includes a joint subscriber management unit for acting as a surrogate in performing a registration activity for enabling a receiver to receive a broadcast and/or in performing an electronic commerce transaction. The joint subscriber management unit includes a reception unit for receiving a reception-limiting identification number of the receiver for receiving a specific broadcast, a broadcaster identification number of at least one broadcaster of a plurality of broadcasters, and registrant information concerning registration of a user allocated to the reception-limiting identification number; a generation unit for generating a joint management identification number corresponding to the reception-limiting identification number received by the reception unit; a recording unit for recording the reception-limiting identification number, the joint management identification number, and the registrant information in a registrant information table in correspondence with one another; a management/operation unit for acting as a surrogate in performing member management and the electronic commerce transaction in accordance with the recorded registrant information table; and a program for causing the joint subscriber management unit to function as a unit for receiving the reception-limiting identification number, the joint management identification number, and transaction information on the user having these identification numbers; a processing unit for processing a processing signal transmitted from the receiver when the identification number in the registrant information table coincides with the received reception-limiting identification number and/or the joint management identification number; and a payment transaction unit for performing a payment transaction involved in the processing performed by the processing unit.

(19) In a joint subscriber management system according to (18), the receiver may include a reception-limiting-identification-number transmitting unit for transmitting the reception-limiting identification number of the receiver to the joint subscriber management unit; a reception unit for receiving the registrant information corresponding to the reception-limiting identification number and the joint management identification number, the registrant information being transmitted from the joint subscriber management unit; and a storage unit for storing the received registrant information.

(20) In a joint subscriber management system according to (19), the joint subscriber management unit may further include a program for causing the joint subscriber management unit to function as a detection unit for detecting updated information of the registrant information; an authentication unit for performing, when the updated information is detected by the detection unit, authentication by comparing the reception-limiting identification number in the registrant information stored in the storage unit of the receiver with the receiver's reception-limiting identification number in the registrant information table registered in the joint subscriber management unit; a processing and payment-transaction unit for receiving the registrant information stored in the receiver when it is confirmed that the two reception-limiting identification numbers coincide with each other, and for processing a processing signal transmitted from the receiver and performing a payment transaction involved in the processing when the registrant information stored in the registrant information table coincides with the registrant information received from the receiver.

(21) In a joint subscriber management system according to (18), the joint subscriber management unit further includes a program for causing the joint subscriber management unit to function as a unit for receiving the registrant information including a plurality of registration items transmitted from the receiver; a registration unit for registering the received registrant information; and a registration-item transmitting unit for selecting a necessary registration item from the registrant information in accordance with a signal transmitted from each of the broadcasters and for transmitting the selected registration item to the broadcaster.

(22) In a joint subscriber management system according to (18), the joint subscriber management unit may further include a program for causing the joint subscriber management unit to perform functions for transmitting a registration information menu page including a plurality of new registration items to the receiver when the joint subscriber management unit receives an unregistered reception-limiting identification number from the receiver; receiving the registrant information set by inputting data by the receiver in accordance with the menu; registering the registrant information so as to correspond to the reception-limiting identification number in accordance with the received registrant information; and generating the joint management identification number when the registrant information is registered.

(23) In a joint subscriber management system according to (18), the broadcaster identification number may include a number of a broadcaster for delivering an interactive broadcast.

(24) In a joint subscriber management system according to (23), the interactive broadcast may include a digital broadcast delivered by using at least one of a satellite, terrestrial waves, a wired network, and a wireless network.

(25) In a joint subscriber management system according to (18), the broadcaster identification number may include a number of a service provider for providing a membership service.

(26) In a joint subscriber management system according to (18), the registrant information may include information including personal information required to perform television commerce, television trading, and television banking.

(27) In a joint subscriber management system according to (18), the joint management identification number may be substituted for by the reception-limiting identification number.

(28) In a joint subscriber management system according to (18), the electronic commerce transaction may include authentication and a payment transaction.

(29) In a joint subscriber management system according to (18), wherein the management/operation unit may include functions for performing authentication, matching, a payment transaction, alteration of contract, and updating.

According to a joint subscriber management system and a receiving terminal, subscriptions and membership registrations with a plurality of broadcasters and service providers can be performed in the block. It is thus possible to reduce the user's burden of making registrations. Since the broadcasters and the service providers can use a single management system, capital investment can be reduced. Because systems for managing/operating contract information and member information are unified, information from a single database is used as registrant information and an ID number for use in performing authentication and payment transactions in e-commerce by data broadcasts. Thus, the processing reliability is improved. Since a joint management identification number is created and managed/operated in accordance with the ID number, it is possible to connect to another system, such as a known broadcasting system. In addition, a notice, such as a bill, can be sent by e-mail over a network. Accordingly, postage and packing become unnecessary, thereby reducing a charge.

BRIEF DESCRIPTION OF THE DRAWINGS

FIG. 1 schematically illustrates the configuration of a joint subscriber management system according to the present invention;

FIG. 2 is a block diagram showing the configuration of a receiving terminal according to the present invention;

FIG. 3 schematically illustrates a flow from application to registration by the joint subscriber management system according to the present invention;

FIG. 4 illustrates an example of a registration application form (postcard) in the joint subscriber management system according to the present invention;

FIG. 6 illustrates an example of a registration screen for registering registrant information by the joint subscriber management system according to the present invention;

FIGS. 7A to 7C illustrate examples of registration screens provided by the joint subscriber management system according to the present invention for broadcasters and service providers;

FIG. 12 illustrates an example of a known registration application screen;

FIG. 13 illustrates examples of known registration application screens;

FIG. 14 illustrates examples of known registration application screens;

FIG. 15 illustrates examples of known registration application screens;

FIG. 16 illustrates examples of known registration application screens; and

FIG. 17 illustrates an example of a known registration application screen.

DESCRIPTION OF THE PREFERRED EMBODIMENTS

Figure 5:
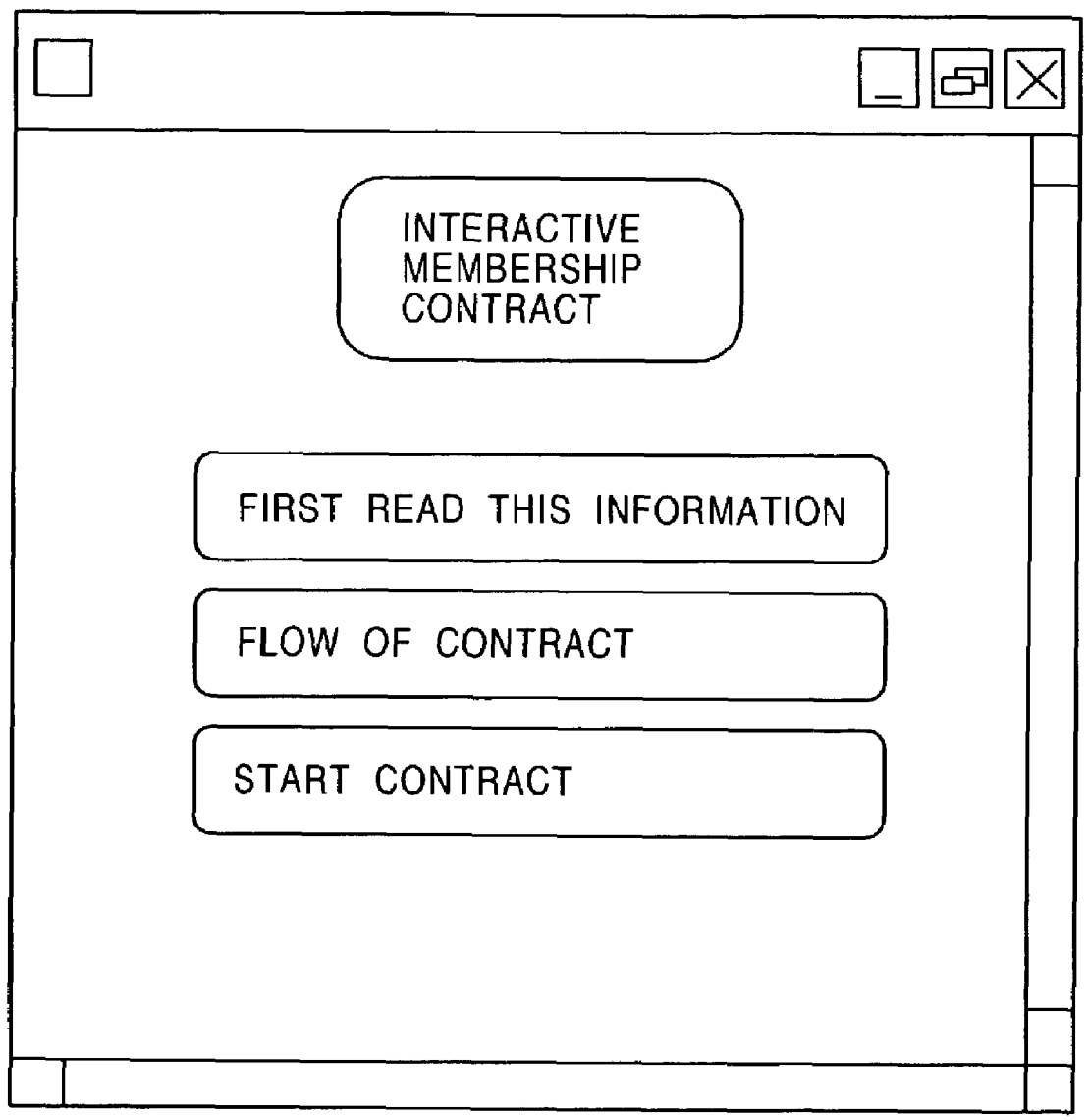
FIG. 5 illustrates an example of an initial registration screen by the joint subscriber management system according to the present invention.

Preferred embodiments of a joint subscriber management system and a receiving terminal according to the present invention will be described with reference to the accompanying drawings.

Referring to FIG. 1, a joint subscriber management system includes a broadcasting system 100 for delivering broadcast programs; a joint management system 200 for registering/managing subscriptions to broadcasters and service providers and registrant information; a receiving system 300 for making subscriptions and for viewing and listening to broadcast programs; a payment transaction system 400 for performing various payment transactions by data broadcasts; and information terminals 600 for making subscriptions to the broadcasters and the service providers and for registering registrant information.

The broadcasting system 100 contains broadcasters (including station A, station B, and station C in FIG. 1) 110; transmitting systems 111, corresponding to the broadcasters 110, for transmitting broadcast programs including data broadcasts; an uplink system 112 for uplinking digital broadcast signals (broadcast programs) from the transmitting systems 111 of the broadcasters 110 to a satellite 150; and a transmission antenna 120. The satellite 150 relays and transmits the uplinked digital broadcast signals from the transmission antenna 120 of the broadcasting system 100 to a receiver 310. Digital broadcasts transmitted and received by the broadcasting system 100 and the receiving system 300 are not limited to broadcasts via the satellite 150 and may include terrestrial broadcasts and broadcasts delivered by wired and wireless networks.

The joint management system 200 contains a broadcasting conditional access system (BCAS) 210 which is connected to the broadcasting system 100 and to the receiving system 300 and which issues and manages unique identification (ID) information recorded in a smart card (B-CAS card) 320 to be inserted into the receiver 310 of the receiving system 300; a conditional access subscriber management system (CA SMS) 220 which is connected to a gateway 230, the BCAS 210, and a CA member database (DB) 221, which manages the ID number and subscription information sent from the receiving system 300, and which transmits the information to the broadcasting system 100; the CA member DB 221, which records and stores the ID number and the subscription information sent from the receiver 310 through the gateway 230 and the CA SMS 220; the gateway 230, which is connected to a network 500, the CA SMS 220, a joint SMS 240, and the broadcasting system 100, and which acts as an intermediary for exchanging the ID number, the subscription information, registrant information, and a joint management identification number; the joint SMS 240, which provides a registration web site (content) for registering the ID number, the subscription information, and the registrant information, which transmits the ID number, the subscription information, and the registrant information transmitted by the receiver 310, the information terminals 600 including a personal computer (PC) 351, a facsimile machine (FAX) 620, and a cellular phone 630, or by mail to the CA SMS 220 and a joint member DB 241, which generates the ID number and the joint management identification number corresponding to the ID number, and which manages the registrant information and performs authentication, matching, and payment transactions in e-commerce in accordance with the joint management number; and the joint member DB 241 for recording and storing the registrant information transmitted through the joint SMS 240.

The joint management system 200 can use the ID number, instead of the joint management identification number, to manage the registrant information. Registration content to be provided includes content on which the ID number and a plurality of pieces of registrant information can be selected and registered in the block or individually. Information including the ID number, the joint management identification number, the subscription information, the registrant information, and a function (program) of the joint management system 200 can be recorded in a recording medium 250, and the recorded information and program can be used by the broadcasting system 100 of each broadcaster.

The receiving system 300 contains an antenna 301 for receiving broadcast signals (radio waves) from the satellite 150; the receiver 310, which is an integrated receiver decoder (IRD), which is connected to the antenna 301 and a monitor 305, and which has a receiving function and a communication function; and the monitor 305 for displaying video/audio data read by the receiver 310. The receiving function of the receiver 310 is performed by inserting the smart card (B-CAS card) 320, which has the ID number for receiving broadcasts, into the receiver 310. As a result, the receiver 310 can receive digital broadcast signals, which are received by the antenna 301. The receiver 310 can read the received digital signals and can transmit video/audio data to the monitor 305. The communication function of the receiver 310 includes connecting to the network 500, such as a telephone line, and transmitting and receiving the ID number, the subscription information, and the registrant information. The smart card 320 has recorded therein the unique ID number, which is a reception-limiting identification number for receiving a desired broadcast, and key information for descrambling scrambled pay-broadcasts. The smart card 320 can be inserted into the receiver 310, thus enabling the receiver 310 to receive a broadcast.

The receiver 310 is arranged, for example, as shown in FIG. 2. The receiver 310 is connected to the antenna 301. The smart card (B-CAS card) 320 has recorded therein the unique ID number information and the key information for descrambling. A smart card slot 321 is connected to a system bus 350. The smart card 320 is inserted into the smart card slot 321 so that the ID number, which is recorded in the smart card 320, can be loaded into the receiver 310. A remote control 330 is used for operating the receiver 310. An input/output (I/O) unit 331 receives operation signals from the remote control 330 and loads the signals through the system bus 350 into the receiver 310. Digital broadcast signals received from the broadcasting system 100 are input to an antenna input terminal 340. A tuner 341 selects desired broadcast program signals from among the received digital broadcast signals. A demodulator 342 performs TS (transport stream) conversion of the digital broadcast signals selected by the tuner 341. A descrambler 343 descrambles the scrambled TS, which has been demodulated by the demodulator 342. A TS decoder 344 divides the descrambled TS, which has been descrambled by the descrambler 343, into an audio stream, a video stream, and data. An audio decoder 345 and a video decoder 346 process the audio and video streams, respectively, which have been generated by the TS decoder 344, and converts the streams into audio and video signals, respectively. When a data broadcast is received, a presentation processor 347 superposes data including moving image data, still image data, and graphic image data which are temporarily stored in a RAM 362 and an NVRAM (non-volatile RAM) 360 and various data including pre-recorded fonts in a ROM 361 onto the audio and video signals and presents the signals. An audio output terminal 348 and a video output terminal 349 output the audio and video signals from the audio decoder 345, the video decoder 346, and the presentation processor 347 to the monitor 305 and the like. The system bus 350 is connected directly or indirectly with components in the receiver 310. The system bus 350 is a communication channel for exchanging control information and various data. The NVRAM 360 is connected to the system bus 350. The NVRAM 360 is a non-volatile memory for recording and storing registrant information and multimedia content data for each broadcaster and each service provider. The ROM 361 is connected to the system bus 350. The ROM 361 is a memory having stored beforehand, for example, font information for character data included in data broadcasts. The RAM 362 is connected to the system bus 350. The RAM 362 is a buffer for transferring multimedia content data transmitted by a data carousel and file-formatted audio content to the audio decoder 345 and the video decoder 346. A CPU 370 controls the components in the receiver 310 through the system bus 350. A communication unit (modem) 380 connects to the network 500, such as a telephone line, and exchanges data concerning the registrant information and the subscription information through the system bus 350.

The payment transaction system 400 is a system including a bank 410 and a securities company 420. The payment transaction system 400 is connected to the user's receiving system 300, the information terminals 600, and the joint management system 200 via the network 500. When an e-commerce transaction including t-commerce, t-banking, and t-trading by using a data broadcast is performed, the payment transaction system 400 performs payment transaction processing in accordance with a predetermined payment transaction method based on the ID number and the subscription information under the management of the CA SMS 220 of the joint management system 200 and the registrant information in the joint member DB 241.

The information terminals 600 include the PC 610, the FAX 620, and the cellular phone 630. The information terminals 600 are connected to the joint management system 200 via the network 500 to make subscriptions and to register registrant information.

With reference to the drawings, a case in which the user registers for subscription and membership by using the joint subscriber management system, which includes the broadcasting system 100, the joint management system 200, the receiving system 300, the payment transaction system 400, and the information terminals 600, will now be described.

FIG. 3 schematically shows a flow from submitting a subscription application or a membership registration application to being registered. When a user submits a subscription application, the user fills out an application form/postcard 640, which is supplied with the purchased receiver 310, by writing predetermined items and sends the application form/postcard 640 by mail or by the FAX 620. An operator at a predetermined registration center receivers the application form/postcard 640 by mail or by FAX, inputs written registrant information to a registration terminal, and sends the registrant information to the joint management system 200. The registrant information is recorded and stored in the CA member DB 221 and the joint member DB 241.

Referring to FIG. 4, the application form/postcard 640 contains a space for writing the ID number of the smart card (B-CAS card) 320 or putting a subscription barcode seal; check boxes which represent broadcasters and service providers and which are to be checked if the user wants to subscribe to; spaces for writing registrant information including personal information on the user and service sharers, such as the user's family members, including the addresses, names, and contact persons; and a space (not shown) for selecting the method of payment by writing an account number or a credit card number. The user checks a desired box(es) of the boxes representing the broadcasters and the service providers, writes the predetermined items, such as the registrant information, and sends the application form/postcard 640 by mail or by the FAX 620.

Alternatively, the user connects to the network 500, such as the Internet, from the information terminal 600, such as the PC 610, the FAX 620, or the cellular phone 630, and accesses a registration web site run by the joint management system 200 (or the joint SMS 240 thereof). Alternatively, the user can receive a registration channel by the receiver 310 and can perform registration. In this case, the user inputs the registrant information by using the remote control 330 in accordance with the displayed registration web site or the registration channel. The information terminal 600 or the communication unit 380 of the receiver 310 transmits the subscription information and the registrant information to the joint management system 200 through the network 500, such as a telephone line. The transmitted information is recorded and stored in the CA member DB 221 and the joint member DB 241.

When the user accesses the web site or receives the registration channel, for example, a start registration screen (interactive membership contract screen), such as that shown in FIG. 5, is displayed. The screen displays a reminder to confirm the contract by displaying a notice ("First read this information") and a description of the flow of contract. The user confirms the contents of the contract by operating the remote control 330 and starts a registration process (to start the contract).

When the registration process starts, for example, an entry screen (content) shown in FIG. 6 is displayed. The entry screen contains a space for writing the ID number of the smart card (B-CAS card) 320; check boxes which represent broadcasters and service providers and which are to be checked if the user wants to subscribe to; and check boxes for writing registrant information including the user's and the service sharers' (such as the user's family members') addresses, names, contact persons, etc. On this entry screen, a predetermined subscription, a membership registration, and registrant information can be registered in the block.

In accordance with the screen display, the user operates the information terminal 600 or the remote control 330 for the receiver 310 to select or check a desired broadcaster(s) and/or a service provider(s) and inputs registrant information. Referring to FIGS. 7A o 7C, the terms and conditions of each of the selected broadcaster(s) and/or the service provider(s) are displayed. When the user agrees to the displayed terms and conditions by checking the "Agree" box, the registration processing is performed.

When the user wants to use the payment transaction system 400 in order to perform various payment transactions, such as t-commerce, t-trading, and t-banking, the user fills out a space (not shown) for selecting the method of payment and inputting a necessary item, such as an account number or a credit card number. As a result, the terms and conditions, similar to those displayed in FIG. 7C, are displayed, and the user is asked if the user agrees to the displayed terms and conditions. When the user checks the "Agree" box, the registration processing is performed. If the user is performing this registration process after the user has made the subscription, the user can use the registrant information (see FIG. 6), which is written in the registrant information space used in the subscription process, to input information including the user's name, address, phone number, facsimile number, and e-mail address on a registration screen in FIG. 7A. Accordingly, the user is only required to fill out an unfilled space, such as a space for writing an account number or a credit card number. Thus, the entry operation can be facilitated.

When the joint management system 200 receives the ID number, the subscription information, and the registrant information from the information terminal 600 or the receiver 310 through the network 500 and the gateway 230, the joint management system 200 records and stores the received information in the CA member DB 221 and the joint member DB 241. Also, the joint management system 200 generates a joint management identification number corresponding to the ID number and manages the registrant information and the like in accordance with the joint management identification number. The joint management system 200 transmits online necessary information, such as the ID number, the joint management identification number, the subscription information, and the registrant information, to the broadcasting system 100 and the payment transaction system 400, or records the necessary information in the recording medium 250, such as a CD-ROM, and sends the recording medium 250 to the broadcasting system 100 and the payment transaction system 400.

The broadcasting system 100 (or each of the transmitting systems 111 thereof) inserts key data for performing descrambling based on the ID number into a digital broadcast signal and transmits the digital broadcast signal to the receiving system 300. The receiver 310 of the receiving system 300 receives the digital broadcast signal from the broadcasting system 200 and extracts the key data. Also, the receiver 310 performs a registration process in accordance with a registration screen (content). The receiver 310 downloads the registrant information, which is recorded in the joint management system 200, through the gateway 230 and the network 500 and writes the downloaded information to the NVRAM 360 in the receiver 310, thus completing the registration of the subscription and the registrant information. Subsequently, the user is permitted to validly view and listen to broadcast programs and to use provided services.

Figure 8:
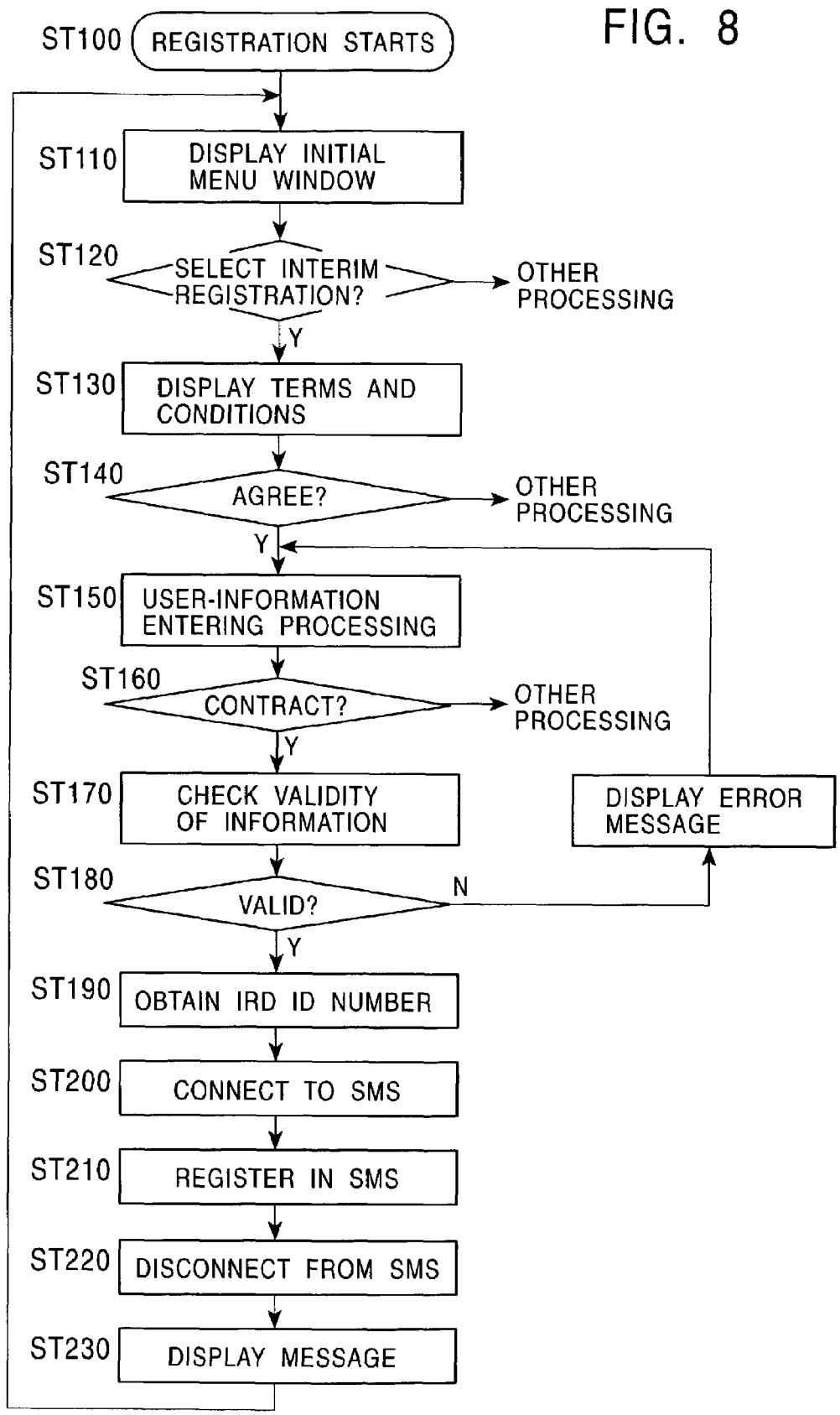
FIG. 8 is a flowchart showing a registration process performed by the joint subscriber management system according to the present invention.
Figure 9:
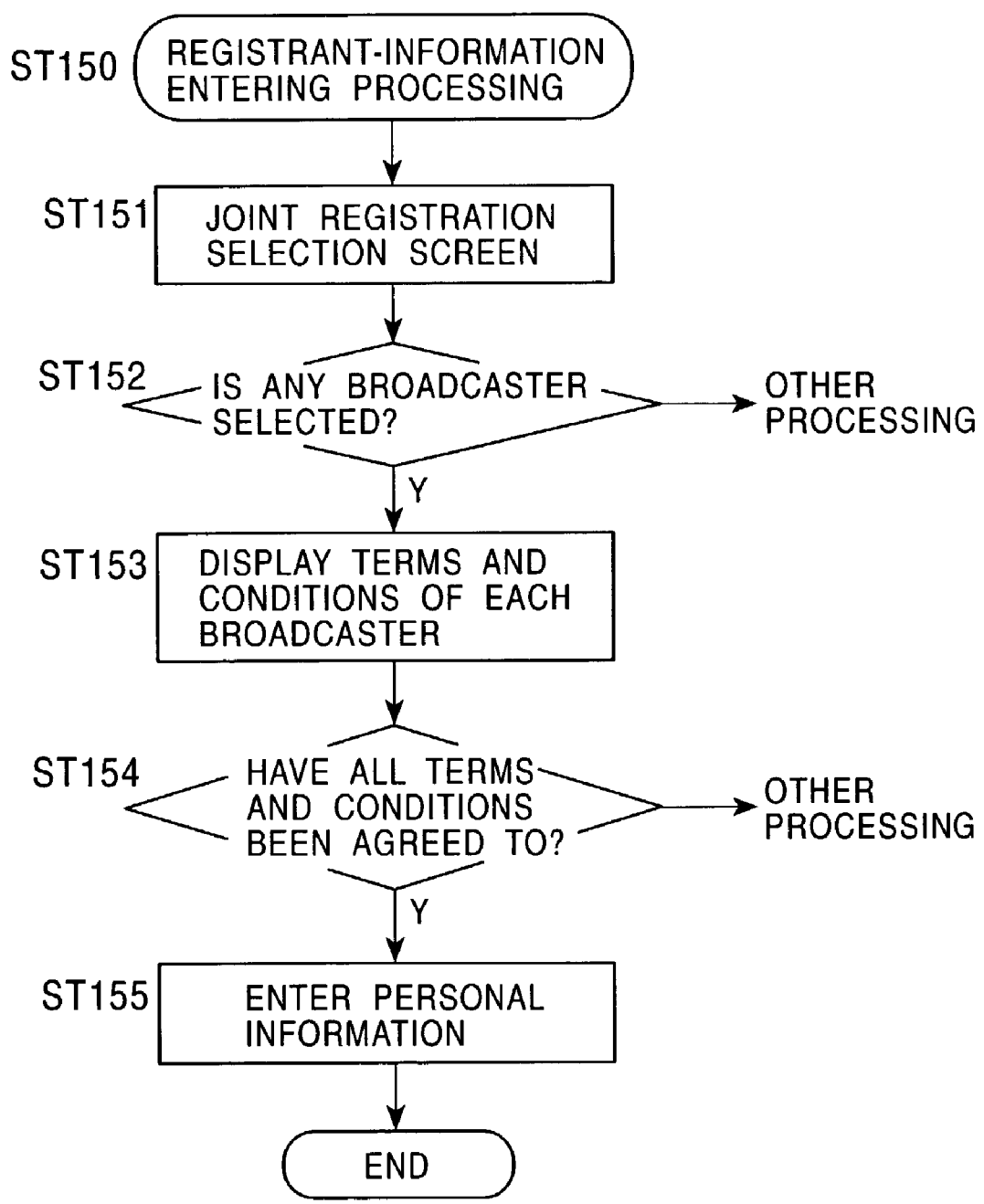
FIG. 9 is a flowchart showing a registrant information entering process in the registration process performed by the joint subscriber management system according to the present invention.

Referring to FIGS. 8 and 9, a specific process from application to registration will now be described.

Referring to FIG. 8, when the user wants to apply for subscription and registration, the user receives a registration channel by the receiver 310 or gains access to a predetermined registration web site. The joint management system 200 transmits an initial menu screen (content) for registration, and the menu screen is displayed by the receiving system 300 (ST100 and ST110). The user reads the notice concerning the registration and confirms the flow of contract. The user chooses whether or not to apply for interim registration, that is, to record and store the information in the CA member DB 221 and the joint member DB 241 of the joint management system 200 (ST120). If the user chooses to apply for interim registration, the terms and conditions of the interim registration are displayed on the screen (ST130). After the user confirms the terms and conditions, the user checks the "Agree" box to agree to the terms and conditions, thereby starting an interim registration process (ST140). If the user does not apply for interim registration or if the user does not check the "Agree" box, the other processing is performed.

When the interim registration process starts, an entry screen for entering registrant information required for registration is displayed (ST150). FIG. 9 shows a flowchart of a registrant information entering process. In accordance with the flowchart shown in FIG. 9, a joint registration selection screen on which a desired broadcaster(s) and/or service provider(s) is (are) selected from among available broadcasters and service providers is displayed, and the user selects a desired broadcaster(s) and/or service provider(s) by checking a box(es) (ST151). If the broadcaster(s) and/or the service provider(s) is (are) selected (ST152), the terms and conditions of each of the selected broadcaster(s) and/or the service provider(s) are displayed, and the user checks a box(es) to agree to the terms and conditions (ST153). When all the terms and conditions have been agreed to (ST154), the user inputs personal information, such as his/her address, name, contact person, etc., and those of the service sharers (his/her family members), and the account number and/or the credit card number required to use the bank 410 and/or the securities company 420 when performing various payment transactions, such as t-commerce, t-trading, and t-banking (ST155). When no broadcaster nor service provider is selected or when the user does not agree to the terms and conditions of the selected broadcaster(s) and/or the service provider(s), the other processing is performed (ST152 and ST154).

After the complete registrant information has been input, the input registrant information and the information on the selected broadcaster(s)/service provider(s) are displayed. The user is requested to finally confirm whether or not to subscribe to the selected broadcaster(s)/service provider(s) (ST160). Also, the joint management system 200 (the CA SMS 220 and the joint SMS 240) checks the validity of the input registrant information and the information on the selected broadcaster(s)/service provider(s) (ST170). If the validity is not confirmed, an error message is transmitted to the receiving system 300 (ST180). If the validity is confirmed, the ID number of the smart card 320 inserted into the receiver 310 is obtained through the network 500 (ST190). Also, the receiver 310 connects to the CA SMS 220 and the joint SMS 240 (ST200), and the ID number and the registrant information are recorded/stored in the CA member DB 221 and the joint member DB 241, thus making interim registration (ST210). Subsequently, the receiver 310 disconnects from the joint management system (ST220). After the interim registration process is completed by the joint management system 200, a message indicating the completion of the interim registration is displayed on the receiving system 300 at the user side (ST230). If the interim registration is not normally completed, an error message is displayed. The registration process returns to the initial menu screen and starts the registration from the beginning (ST230→ ST110).

Figure 10:
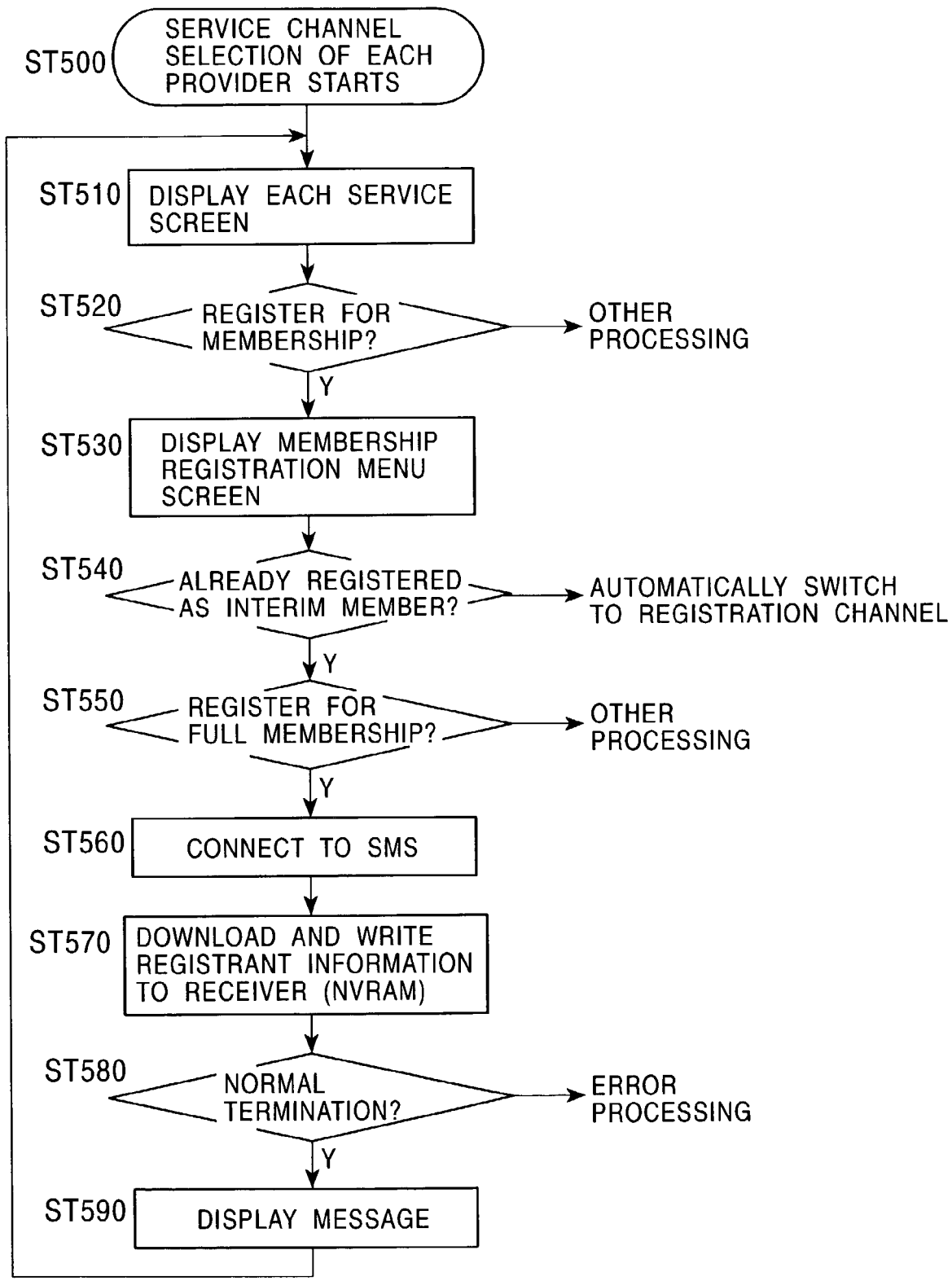
FIG. 10 is a flowchart showing a registration process of registering to broadcasters and service providers in the joint subscriber management system according to the present invention.

With reference to FIG. 10, a process performed between the completion of the interim registration with the joint management system 200 (see FIGS. 8 and 9) and a process for making formal registration (full registration) will be described.

When the interim registration is completed, formal registration is made as follows. The user uses the receiving system 300 to select and receive a broadcast delivered by the broadcaster to which the user has registered for interim subscription, and a selection screen asking the user whether or not to make formal (full) registration is displayed (ST500 and ST510). When the user uses the remote control 330 to send a request for formal registration from the receiver 310 (ST520), a registration menu screen (content) is displayed (ST530). It is determined whether or not the user has been already registered as an interim member (ST540). If the determination is negative, for example, the process automatically switches to a registration broadcast channel and prompts the user to make interim registration (ST540).

If the user has been already registered as an interim member (ST540), the user confirms whether to register as a formal (full) member (ST550). If the user wants to register as a formal (full) member, the communication unit 380 of the receiver 310 automatically connects to the joint management system 200 via the network 500, such as a telephone line (ST560), and authentication is performed in accordance with the ID number of the smart card 320 inserted into the receiver 310. After the authentication succeeded, predetermined registrant information including the joint management identification number and the information on the selected broadcaster(s)/service provider(s) is downloaded from the joint management system 200 and temporarily stored in the RAM 362, and the downloaded information is displayed on the monitor 305. The user confirms the registrant information and the like displayed on the monitor 305 and writes the registrant information to the NVRAM 360 of the receiver 310 by operating the remote control 330 (ST570). The monitor 305 displays whether the write processing succeeded or failed (ST580). If a write error occurs, the process returns to the registration screen and starts a formal (full) registration process from the beginning. If the registrant information is successfully written to the NVRAM 360, the formal (full) registration is completed.

When changing or updating the registrant information or the like after the user has been registered as a formal (full) member, the receiver 310 extracts the registrant information and edits (changes/updates) the registrant information. When the edited registrant information is sent to the joint management system 200, authentication is performed in accordance with the joint management identification number. After the authentication succeeded, the old registrant information recorded/stored in the CA member DB 221 and the joint member DB 241 is changed/updated through the CA SMS 220 and the joint SMS 240, and the new registrant information, that is, the changed/updated registrant information, is transmitted to the receiver 310. The receiver 310 writes the transmitted new registrant information to the NVRAM 360. From this point onward, the user can continuously receive a broadcast program and can use a provided service.

Figure 11:
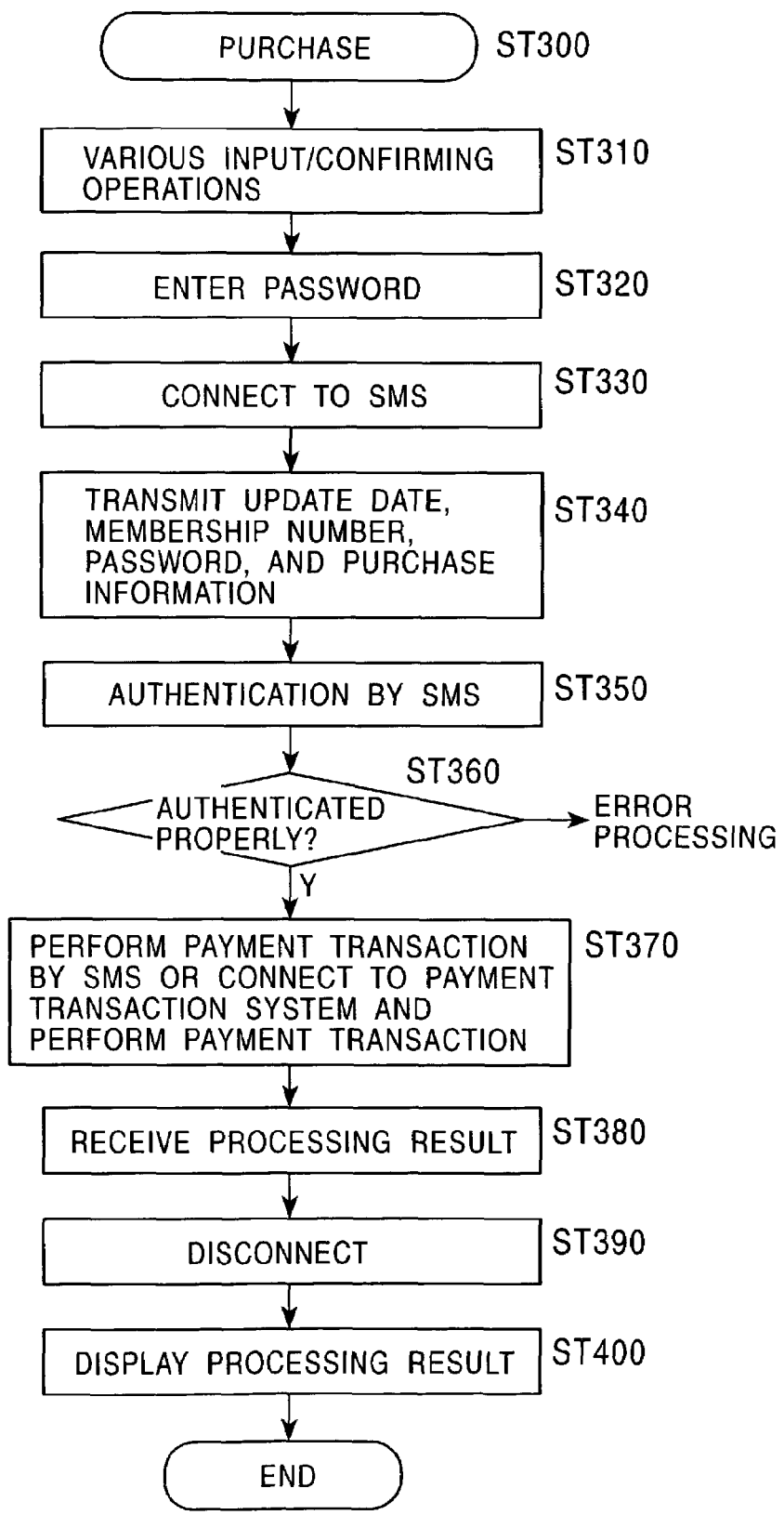
FIG. 11 is a flowchart showing a process of performing an e-commerce transaction by a data broadcast in the joint subscriber management system according to the present invention.

With reference to FIG. 11, a process of performing e-commerce by data broadcasting will now be described.

A user receives a data broadcast for performing e-commerce, that is, t-commerce, t-banking, or t-trading. The user uses the remote control 330 to select a desired item number and a correspondent bank/securities company (ST300). The user performs predetermined input/confirming operations, such as confirming input information displayed on the monitor 305 (ST310). When the user enters a password for authentication (ST320), the receiver 310 connects to the joint management system 200 via the network 500, such as a telephone line (ST330), and transmits necessary information, such as the input information, the password information, the ID number of the smart card 320, and the registrant information recorded in the NVRAM 360, from the communication unit 380 (ST340). The joint management system 200 performs authentication in accordance with the input information, the ID number, and the registrant information from the receiver 310. If the authentication failed, error processing, such as transmission of an error message to the receiver 310, is performed.

If the authentication succeeded, predetermined processing is performed. For example, the joint SMS 240 performs various transactions, such as a payment transaction. Also, the process connects to the predetermined payment transaction system 400 in accordance with the registrant information and transmits data required to perform authentication for a payment transaction and to perform a payment transaction (ST370). The processing result is transmitted to the receiver 310 through the network 500 (ST380). When the receiver 310 receives the processing result from the joint management system 200 (ST380), the receiver 310 disconnects from the joint management system 200 (ST390), and the processing result is displayed on the monitor 305 (ST400).

A specific example of a data broadcast using this type of e-commerce will now be described.

When the user is watching a broadcast television shopping program using the receiving system 300 and wants to purchase a desired item, the user uses the remote control 330 to select an item to purchase, enters an item number and password, and confirms and agrees to the input information on the monitor 305. Subsequently, the communication unit 380 of the receiver 310 connects to the joint management system 200 through the network 500, such as a telephone line, and transmits the purchase information, such as the item number, the password information, the ID number of the smart card 320, and the predetermined registrant information, which is recorded in the NVRAM 360 of the receiver 310 and which is required to use the broadcast program. The joint management system 200 performs authentication in accordance with the input information, the ID number, and the registrant information from the receiver 310. If the authentication failed, error processing, such as transmission of an error message to the receiver 310, is performed.

If the authentication succeeded, the joint SMS 240 performs predetermined processing. For example, purchase-procedure completion information such as a purchase agreement message, account debit date, and shipping date is transmitted to the receiver 310 through the network 500. The joint SMS 240 performs a payment transaction, notifies online or by a predetermined method the pre-registered payment transaction system 400, such as a bank or a securities company, and charges a handling fee. Alternatively, a bill from a broadcaster, a service provider, a bank, or a securities company can be sent by e-mail.

When the receiver 310 receives the purchase-procedure completion information from the joint management system 200, the receiver 310 disconnects from the joint management system 200 and displays the information including the purchase agreement message, the account debit date, and the shipping date on the monitor 305. The broadcast program is not limited to television shopping. It is applicable to any type of broadcast as long as it uses a form of e-commerce, such as t-commerce, t-banking, and t-trading.

A case in which a user uses a participating-type data broadcast will now be described.

The user watches/listens to an interactively broadcast game program or a quiz/questionnaire broadcast program by the receiving system 300. The user can download content, such as a game, to the receiver 310 and can use the downloaded content. The communication unit 380 of the receiver 310 transmits the ID number of the smart card 320, predetermined registrant information, which is recorded in the NVRAM 360 and which is required to use the broadcast program, score information indicating the result of the game, input data such as the answers to the quiz or the questionnaire, to the joint management system 200 through the network 500, such as a telephone line.

When the joint management system 200 receives the input data, the ID number, and the registrant information from the receiver 310, the joint management system 200 performs authentication in accordance with the ID number and the registrant information. If the authentication failed, error processing, such as transmission of an error message to the receiver 310, is performed. If the authentication succeeded, the joint SMS 240 processes the input data from the receiver 310 and transmits response data, such as a game score ranking and a compilation result generated by compiling the answers to the quiz or the questionnaire, to the receiver 310 through the gateway 230 and the network 500. The receiver 310 displays the response data, such as the ranking and the compilation result, on the monitor 305. The joint management system 200 can ship a prize to the user in accordance with the registrant information and response data, which is the processing result, or can send a questionnaire by e-mail.

What is claimed is:

1. A joint subscriber management system comprising:
a joint subscriber management unit for acting as a surrogate in performing a registration activity for enabling a receiver to receive a broadcast and/or in performing an electronic commerce transaction, wherein the joint subscriber management unit comprises:
first reception means for receiving a reception-limiting identification number of the receiver for receiving a specific broadcast, a broadcaster identification number of at least one broadcaster of a plurality of broadcasters, and registrant information concerning registration of a user allocated to the reception-limiting identification number;

generation means for generating a joint management identification number corresponding to the reception-limiting identification number received by the first reception means;

recording means for recording the reception-limiting identification number, the joint management identification number, and the registrant information in a registrant information table in correspondence with one another;

management/operation means for acting as a surrogate in performing member management and the electronic commerce transaction in accordance with the recorded registrant information table;

reception-limiting-identification-number transmitting means for transmitting the reception-limiting identification number included in the receiver to the joint subscriber management unit;

second reception means for receiving the registrant information corresponding to the reception-limiting identification number and the joint management identification number, the registrant information being transmitted from the joint subscriber management unit;

storage means for storing the received registrant information;

detection means for detecting updated information of the registrant information;

authentication means for performing, when the updated information is detected by the detection means, authentication by comparing the reception-limiting identification number included in the receiver with the receiver's reception-limiting identification number in the registrant information table registered in the joint subscriber management unit;

processing means for receiving the registrant information stored in the receiver on confirmation that the two reception-limiting identification numbers coincide with each other, and for processing a processing signal transmitted from the receiver when the registrant information stored in the registrant information table coincides with the registrant information received from the receiver; and payment transaction means for performing a payment transaction involved in the processing performed by the processing means.

2. A joint subscriber management system comprising:

a joint subscriber management unit for acting as a surrogate in performing a registration activity for enabling a receiver to receive a broadcast and/or in performing an electronic commerce transaction, wherein the joint subscriber management unit comprises:

reception means for receiving a reception-limiting identification number of the receiver for receiving a specific broadcast, a broadcaster identification number of at least one broadcaster of a plurality of broadcasters, and registrant information concerning registration of a user allocated to the reception-limiting identification number;

generation means for generating a joint management identification number corresponding to the reception-limiting identification number received by the reception means;

recording means for recording the reception-limiting identification number, the joint management identification number, and the registrant information in a registrant information table in correspondence with one another; and management/operation means for acting as a surrogate in performing member management and the electronic commerce transaction in accordance with the recorded registrant information table, wherein, when the joint subscriber management unit receives an unregistered reception-limiting identification number from the receiver, the joint subscriber management unit transmits a registration information menu page including a plurality of new registration items to the receiver, the joint subscriber management unit receives the registrant information set by inputting data by the receiver in accordance with the menu, the joint subscriber management unit registers the registrant information so as to correspond to the reception-limiting identification number in accordance with the received registrant information, and the joint subscriber management unit generates the joint management identification number when the registrant information is registered.

3. A receiving terminal comprising:

a receiving terminal in a joint subscriber management system comprising a joint subscriber management unit for acting as a surrogate in performing a registration activity for enabling a receiver to receive a broadcast and/or in performing an electronic commerce transaction, the joint subscriber management unit comprising:

reception means for receiving a reception-limiting identification number of the receiver for receiving a specific broadcast, a broadcaster identification number of at least one broadcaster of a plurality of broadcasters, and registrant information concerning registration of a user allocated to the reception-limiting identification number;

generation means for generating a joint management identification number corresponding to the reception-limiting identification number received by the reception means;

recording means for recording the reception-limiting identification number, the joint management identification number, and the registrant information in a registrant information table in correspondence with one another; and management/operation means for acting as a surrogate in performing member management and the electronic commerce transaction in accordance with the recorded registrant information table, the receiving terminal comprising:

reception-limiting-identification-number transmitting means for transmitting the reception-limiting identification number of the receiver to the joint subscriber management unit; and storage means for storing the registrant information, wherein the registrant information comprises the reception-limiting identification number and the joint management identification number, the joint management identification number being generated in correspondence with information on a user owning the receiver and the reception-limiting identification number, and the registrant information is transmitted to the receiver only when the reception-limiting identification number received by the joint subscriber management unit can be recognized from the registrant information table, wherein the joint subscriber management unit further comprises:

detection means for detecting updated information of the registrant information;

authentication means for performing, when the updated information is detected by the detection means, authentication by comparing the reception-limiting identification number in the registrant information stored in the storage means of the receiver with the receiver's reception-limiting identification number in the registrant information table registered in the joint subscriber management unit; and processing and payment-transaction means for receiving the registrant information stored in the receiver on confirmation that the two reception-limiting identification numbers coincide with each other, and for processing a processing signal transmitted from the receiver and performing a payment transaction involved in the processing when the registrant information stored in the registrant information table coincides with the registrant information received from the receiver.

4. A receiving terminal comprising:

a receiving terminal in a joint subscriber management system comprising a joint subscriber management unit for acting as a surrogate in performing a registration activity for enabling a receiver to receive a broadcast and/or in performing an electronic commerce transaction, the joint subscriber management unit comprising:

reception means for receiving a reception-limiting identification number of the receiver for receiving a specific broadcast, a broadcaster identification number of at least one broadcaster of a plurality of broadcasters, and registrant information concerning registration of a user allocated to the reception-limiting identification number;

generation means for generating a joint management identification number corresponding to the reception-limiting identification number received by the reception means;

recording means for recording the reception-limiting identification number, the joint management identification number, and the registrant information in a registrant information table in correspondence with one another; and management/operation means for acting as a surrogate in performing member management and the electronic commerce transaction in accordance with the recorded registrant information table, the receiving terminal comprising:

reception-limiting-identification-number transmitting means for transmitting the reception-limiting identification number of the receiver to the joint subscriber management unit; and storage means for storing the registrant information, wherein the registrant information comprises the reception-limiting identification number and the joint management identification number, the joint management identification number being generated in correspondence with information on a user owning the receiver and the reception-limiting identification number, and the registrant information is transmitted to the receiver only when the reception-limiting identification number received by the joint subscriber management unit can be recognized from the registrant information table, wherein, when the joint subscriber management unit receives an unregistered reception-limiting identification number from the receiver, the joint subscriber management unit transmits a registration information menu page including a plurality of new registration items to the receiver, the joint subscriber management unit receives the registrant information set by inputting data by the receiver in accordance with the menu, the joint subscriber management unit registers the registrant information so as to correspond to the reception-limiting identification number in accordance with the received registrant information, and the joint subscriber management unit generates the joint management identification number when the registrant information is registered.

5. A joint subscriber management system comprising:

a joint subscriber management unit for acting as a surrogate in performing a registration activity for enabling a receiver to receive a broadcast and/or in performing an electronic commerce transaction, wherein the joint subscriber management unit comprises:

first reception means for receiving a reception-limiting identification number of the receiver for receiving a specific broadcast, a broadcaster identification number of at least one broadcaster of a plurality of broadcasters, and registrant information concerning registration of a user allocated to the reception-limiting identification number;

generation means for generating a joint management identification number corresponding to the reception-limiting identification number received by the first reception means;

recording means for recording the reception-limiting identification number, the joint management identification number, and the registrant information in a registrant information table in correspondence with one another;

management/operation means for acting as a surrogate in performing member management and the electronic commerce transaction in accordance with the recorded registrant information table; and a program for causing the joint subscriber management unit to function as:

means for receiving the reception-limiting identification number, the joint management identification number, and transaction information on the user having these identification numbers;

processing means for processing a processing signal transmitted from the receiver when the identification number in the registrant information table coincides with the received reception-limiting identification number and/or the joint management identification number;

payment transaction means for performing a payment transaction involved in the processing performed by the processing means, detection means for detecting updated information of the registrant information;

authentication means for performing, when the updated information is detected by the detection means, authentication by comparing the reception-limiting identification number in the registrant information stored in the storage means of the receiver with the receiver's reception-limiting identification number in the registrant information table registered in the joint subscriber management unit; and processing and payment-transaction means for receiving the registrant information stored in the receiver on confirmation that the two reception-limiting identification numbers coincide with each other, and for processing a processing signal transmitted from the receiver and performing a payment transaction involved in the processing when the registrant information stored in the registrant information table coincides with the registrant information received from the receiver, wherein the receiver comprises:

reception-limiting-identification-number transmitting means for transmitting the reception-limiting identification number of the receiver to the joint subscriber management unit;

second reception means for receiving the registrant information corresponding to the reception-limiting identification number and the joint management identification number, the registrant information being transmitted from the joint subscriber management unit; and storage means for storing the received registrant information.

6. A joint subscriber management system comprising:

a joint subscriber management unit for acting as a surrogate in performing a registration activity for enabling a receiver to receive a broadcast and/or in performing an electronic commerce transaction, wherein the joint subscriber management unit comprises:

reception means for receiving a reception-limiting identification number of the receiver for receiving a specific broadcast, a broadcaster identification number of at least one broadcaster of a plurality of broadcasters, and registrant information concerning registration of a user allocated to the reception-limiting identification number;

generation means for generating a joint management identification number corresponding to the reception-limiting identification number received by the reception means;

recording means for recording the reception-limiting identification number, the joint management identification number, and the registrant information in a registrant information table in correspondence with one another;

management/operation means for acting as a surrogate in performing member management and the electronic commerce transaction in accordance with the recorded registrant information table; and a program for causing the joint subscriber management unit to function as:

means for receiving the reception-limiting identification number, the joint management identification number, and transaction information on the user having these identification numbers;

processing means for processing a processing signal transmitted from the receiver when the identification number in the registrant information table coincides with the received reception-limiting identification number and/or the joint management identification number; and payment transaction means for performing a payment transaction involved in the processing performed by the processing means, wherein the joint subscriber management unit further comprises a program for causing the joint subscriber management unit to perform functions for:

transmitting a registration information menu page including a plurality of new registration items to the receiver when the joint subscriber management unit receives an unregistered reception-limiting identification number from the receiver, receiving the registrant information set by inputting data by the receiver in accordance with the menu, registering the registrant information so as to correspond to the reception-limiting identification number in accordance with the received registrant information, and generating the joint management identification number when the registrant information is registered.

7. A joint subscriber management system comprising:

a joint subscriber management unit for acting as a surrogate in performing a registration activity for enabling a receiver to receive a broadcast and/or in performing an electronic commerce transaction, wherein the joint subscriber management unit comprises:

a reception unit configured to receive a reception-limiting identification number of the receiver for receiving a specific broadcast, a broadcaster identification number of at least one broadcaster of a plurality of broadcasters, and registrant information concerning registration of a user allocated to the reception-limiting identification number;

a generation unit configured to generate a joint management identification number corresponding to the reception-limiting identification number received by the reception unit;

a recording unit configured to record the reception-limiting identification number, the joint management identification number, and the registrant information in a registrant information table in correspondence with one another;

a management/operation unit configured to act as a surrogate in performing member management and the electronic commerce transaction in accordance with the recorded registrant information table;

a detection unit configured to detect updated information of the registrant information and a reception-limiting identification number included with the receiver;

an authentication unit configured to perform, when the updated information is detected by the detection unit, authentication by comparing the reception-limiting identification number included in the receiver with the receiver's reception-limiting identification number in the registrant information table registered in the joint subscriber management unit;

a processing unit configured to receive the registrant information stored in the receiver on confirmation that the two reception-limiting identification numbers coincide with each other, and for processing a processing a signal received from the receiver when the registrant information stored in the registrant information table coincides with the registrant information received from the receiver; and a payment transaction unit configured to perform a payment transaction involved in the processing performed by the processing unit.

* * * * *